United States Patent

[11] 3,617,829

[72] Inventor Israel Arnold Lesk
Scottsdale, Ariz.
[21] Appl. No. 881,257
[22] Filed Dec. 1, 1969
[45] Patented Nov. 2, 1971
[73] Assignee Motorola, Inc.
Franklin Park, Ill.

[54] RADIATION-INSENSITIVE VOLTAGE STANDARD MEANS
8 Claims, 5 Drawing Figs.

[52] U.S. Cl. .................................................. 317/235 R,
317/235 AE, 317/235 T, 317/235 AB, 317/235 N
[51] Int. Cl. .................................................. H01l 9/00
[50] Field of Search .......................................... 317/235
AE, 235 T, 235 AB, 235 N, 235 (44), 235 (30), 235 (41.1), 235 (27)

[56] References Cited

UNITED STATES PATENTS 3,277,352 10/1966 Hubner ........................ 317/234
3,400,306 9/1968 Knauss ........................ 317/234
3,268,739 8/1966 Dickson ........................ 307/88.5

*Primary Examiner*—John W. Huckert
*Assistant Examiner*—Martin H. Edlow
*Attorney*—Mueller, Aichele & Rauner

ABSTRACT: A diode which is used as the forward-biased element of a pair of series-connected diodes comprising a zero temperature coefficient voltage standard means is hardened against irradiation by neutrons. The diode can take one of several forms. These forms include diodes having thin bases and high recombination surfaces, transistors each having a plurality of collectors, each shorted to the base thereof four-layer semiconductor elements in which the middle two layers are very thin. In each case, the excess number of minority carriers is kept constant for a given current through the forward-biased element, resulting in an unchanged voltage drop at a given current after neutron irradiation.

Figure 1:
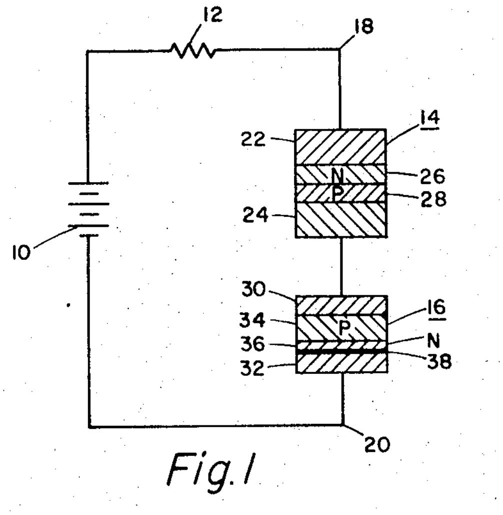

INVENTOR.
Israel A. Lesk

BY
Mueller, Aichele & Rauner
ATTY'S.

RADIATION-INSENSITIVE VOLTAGE STANDARD MEANS

BACKGROUND

This invention relates to diodes whose change in forward voltage drop with neutron irradiation thereof is controllable and to voltage standard means which comprise a forwardly biased diode and a reverse-biased diode, the voltage standard means providing a substantially constant voltage even though the voltage standard means is subjected to irradiation by neutrons.

It is known to compensate for the changes in breakdown voltage of a voltage standard device comprising a reverse-biased diode with temperature changes thereof by connecting it in series with a forwardly biased diode whose forward voltage drop varies oppositely with changes in temperature. Many such temperature-compensated voltage standard means, however, are radiation sensitive, that is, the voltage standard provided by such two diodes connected in series varies with radiation thereof. Such a radiation-sensitive standard device is not suitable in areas such as space where radiation thereof by neutrons may take place.

A radiation-insensitive, forward-biased diode comprising a transistor, one of whose two rectifying junctions is short circuited, is known. However, in such a known diode, the structure is such that while the resistance across the shorted PN junction path is very low, it is not zero. A radiation-insensitive, forward-biased diode comprising two contacting layers of semiconductive material of opposite conductivity type in which the N-layer is very thin is also known. However, in such a diode, the excess minority carriers created by radiation are not fully recombined in the thickness of the N-layer, whereby the diode, while not so sensitive to neutron radiation as diodes of the prior art, still exhibits forward resistance which varies with radiation.

It is an object of this invention to provide an improved diode whose radiation variation of forward voltage drop is substantially zero.

It is a further object of this invention to provide an improved voltage standard means which provides zero change with change in temperature and also with irradiation by neutrons thereof.

SUMMARY

In accordance with this invention, improved diodes are provided whose forward voltage drop varies with temperature and whose forward voltage drop changes very little with irradiation thereof.

Such a diode is one in which the excess of minority carriers therein for a given current through the diode is always a constant amount even though the radiation applied thereto may vary. One way to keep the number of excess minority carriers constant is to make the excess number at the side of the thin base region opposite the PN junction zero. Another way to do so is to keep the excess number of minority carriers at the side of the thin base region opposite the PN junction constant. The diode may take one of three forms. In one form, the diode includes a PN junction in which one of the layers of semiconductor material is very thin thereby producing a very short diffusion length path for the minority carriers. However, a high recombination surface is provided for the exposed side of the thin base layer to recombine the excess minority carriers, whereby the number of excess minority carriers there is kept at zero. In another form, a transistor is provided in which one of the PN junctions is shorted and in which improved geometry of the transistor is provided to make sure that the resistance drop across the shorted junction is zero. In both of these forms of diodes, the excess of minority carriers at the side of the base layer opposite the PN junction is kept at a constant value of zero. In a third form, a four-layer semiconductive device in which the two intermediate layers are very thin is used as a diode. In this diode, the sums of the voltages across the three PN junctions in the range of currents that is to be used in the described voltage standard means, are substantially constant even though the four-layer semiconductive device is exposed to radiation by neutrons, whereby the number of excess minority carriers in the thin base regions is maintained at a constant value.

In each form of diode, the forward-biased threshold does not vary substantially with radiation. Since the variation of breakdown voltage of a reverse-biased diode varies very little with neutron radiation of the diode, and particularly since the small amount of variation in voltage with irradiation by neutrons of the forwardly and of the reversely biased diodes is opposite in direction, a voltage standard means comprising a reversely biased diode and a here disclosed forwardly biased diode is provided which is substantially independent of irradiation by neutrons. Since the mechanisms for temperature response of the forwardly and reversely biased diodes are unchanged, the zero temperature response of the voltage of the standard device comprising two diodes is not affected by the use of the here disclosed forwardly biased diodes.

DESCRIPTION

Figure 2:
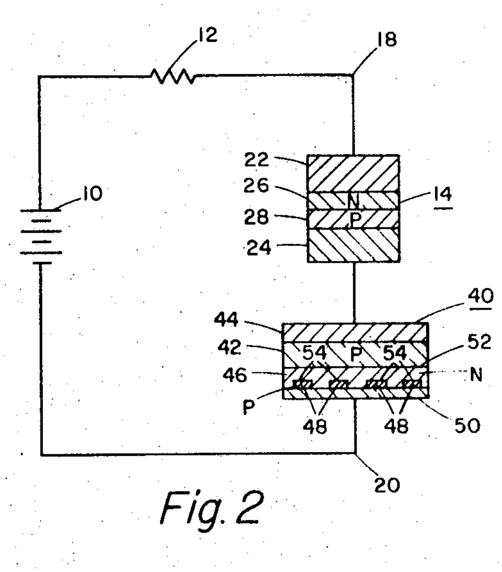
Figure 3:
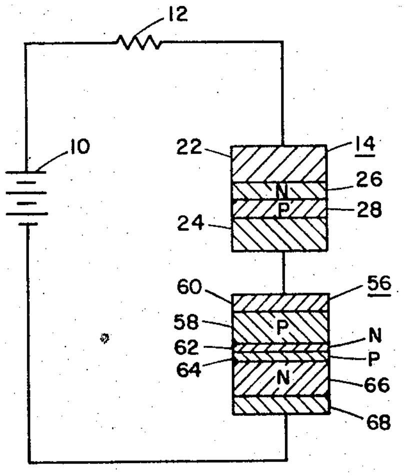
Figure 4:
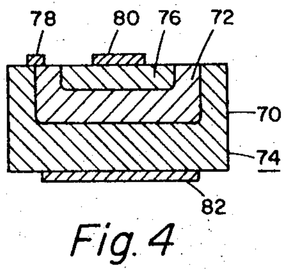
Figure 5:
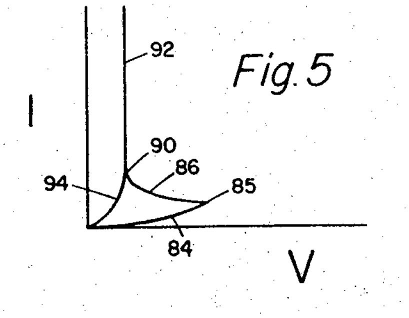

The invention will be better understood upon reading the following description in connection with the accompanying drawing in which FIGS. 1, 2, and 3 each illustrate an apparatus according to this invention, FIG. 4 illustrates a prior art diode which is useful in explaining the operation of one embodiment of this invention, and FIG. 5 illustrates a curve which is useful in explaining the operation of another embodiment of this invention.

First, considering FIG. 1, a battery 10 is connected in series with a resistor 12, a reverse-biased diode 14, and a forwardly biased diode 16. The diodes 14 and 16 are connected in series as shown, and comprise a voltage standard means, the standard voltage appearing between the junction 18 of the resistor 12 and the diode 14 and the junction 20 of the diode 16 and the battery 10.

In this discussion, the P-layer of a diode will be called its anode and the N-layer will be called its cathode, whatever the polarity of the voltage connected thereto.

The reversely biased diode 14, which is shown in cross section, comprises a pair of conductive electrodes 22 and 24 and a cathode layer 26 of semiconductive material of the N-type and an anode layer 28 of semiconductive material of the P-type. The two layers 26 and 28 provide a PN junction between them. The layers 26 and 28 are respectively in contact with the electrodes 22 and 24. The electrode 22 is connected to the positive terminal of a source 10 by way of the resistor 12, whereby the diode 14 is reverse biased.

The forwardly biased diode 16 comprises conductive electrodes 30 and 32. A P-layer 34 is formed in contact with the electrode 30 and a thin N-base layer 36 is in contact with the P-layer 34 providing a PN junction. A very thin recombination surface 38 is provided on the surface of the layer 36 that is in contact with the electrode 32. This surface 38 may be produced by roughening the exposed surface of the N-layer 36 before the electrode 32 is applied thereto.

As is known, when the diode 14 is reverse biased by the battery 10 in the avalanche region, the diode 14 acts as a voltage standard means whose breakdown voltage, however, increases with an increase in temperature. Also, as is known, the forward voltage drop in the forwardly biased diode 16 decreases as the temperature of the diode 16 increases, whereby the reference voltage of the series-connected diodes 14 and 16 tends to remain constant with change in temperature. However, for known voltage standard means comprising a series connection of a reverse-biased diode and a forward-biased diode, the voltage standard provided thereby varies with neutron irradiation thereof.

The change in breakdown voltage exhibited by a reversely biased diode due to irradiation thereof and when used alone would be quite small and positive. That is, the reverse-biased breakdown voltage increases slowly with increase in neutron radiation. However, the forward voltage drop of a known diode varies much faster with the same amount of irradiation by neutrons, at first still in the opposite direction to that of the reverse-biased diode, and at higher levels of radiation in the same direction as the avalanche breakdown of a diode such as 14. It has been found that the diffusion length of minority carriers in a known diode decreases rapidly with radiation by neutrons, whereby the forward voltage drop therein at first decreases and then increases rapidly with radiation. By providing a thin cathode 36, the effects of change in diffusion length of minority carriers with change in irradiation can be decreased. However, if the cathode layer is made very thin, that is, equal in thickness to the diffusion length of minority carriers in radiated semiconductive material, the resultant diffusion length for the minority carriers before radiation will be longer than the thickness of the thin cathode thickness. Therefore, a high recombination surface 38 is provided at the interface between the cathode layer 36 and the electrode 32 to make sure that the diffusion length does not exceed the thickness of the layer 36. If the layer 38 were not provided, there would be a substantial voltage drop between the layer 36 and the electrode 32 due to the presence of excess minority carriers. However, in the showing of FIG. 1, the recombination of the excess minority carriers takes place in the high recombination layer or surface 38, whereby there is no voltage drop at the interface between the surface of the layer 36 and the electrode 32. Since there is no voltage drop at this interface, there can be no change of voltage due to the change in production of excess minority carriers due to neutron irradiation and therefore the diode 16 can provide no (or very little) change in forward voltage with change in neutron irradiation.

In FIG. 2, another radiation-hardened, forwardly biased diode is disclosed. In FIGS. 1 and 2, same reference characters are given to the same elements. The forwardly biased diode 40 of FIG. 2 takes the form of a transistor having an emitter 42 of P-material and having an electrode 44 in therewith, a base 46 of N-material having a plurality of collectors 48 embedded therein. The diode 40 can be made by providing heavily doped monocrystalline P-material 42, by epitaxially growing a layer of lightly doped N-material 46 in contact with one side thereof, and by diffusing P-material in several separate collector islands 48 into the layer 46. An electrode 50 is in contact with the base 46 and with all of the collectors 48, whereby the electrode 50 short circuits the PN junctions 54 provided by the collectors 48 and the base 46, whereby a diode 40 results. The PN junction 52 of the diode 40 between the emitter 42 and the bases 46 is forwardly biased due to the connection of the diode 40 in the series circuit comprising the source 10 and the resistor 12, the reversely biased diode 14, and the forwardly biased diode 40. As in FIG. 1, the standard voltage may be taken between the terminals 18 and 20.

In the diode 40 of FIG. 2, the effect of a change in excess minority carriers produced by irradiation with neutrons is eliminated or substantially reduced as in FIG. 1 by providing a PN junction having a constant, in this case a zero voltage drop thereacross. This is accomplished by the geometry of the diode 40. The operation of the diode 40 may be better understood by considering a known diode 74 shown in FIG. 4 of transistor form in which the base 72 is diffused into the collector 70 and the emitter 76 is diffused into the base 72 and the PN junction between the base 72 and the collector 70 is shorted as by an electrode 78. The resistance of the PN junction between the base 72 and the collector 70 is not zero even though it is shorted by the electrode 78 since, after the carriers arrive in the base region 72, they must travel a relatively long distance to arrive at the short circuiting electrode 78. Therefore, the shorted PN junction between the base 72 and the collector 70 presents a real, though small, resistance to current flow from the emitter electrode 80 to the base electrode 82. Returning to the diode 40 of FIG. 2, the carriers flow from the electrode 44 to the emitter layer 42, through the first PN junction 52, and then through a more direct route to the electrode 50. The electrode 50 acts both as a second electrode for the diode 40 and also a shorting electrode for shorting the collectors 48 to the base 46. The excess minority carriers in the base 46 will more readily get into the collectors 48 to be recombined therein than if the structure of FIG. 4 were used, whereby the resistance across the PN junction or interface 54 between the collectors 48 and the electrodes 50 is zero, that is, the excess minority carriers at the electrode 50 are reduced to a constant value of zero, whereby the diode 40 exhibits very little, if any, change in forward voltage with neutron irradiation thereof.

In FIG. 3, the elements 10, 12, and 14 and their connections correspond to the elements having similar reference characters of FIGS. 1 and 2. The forwardly biased diode 56 of FIG. 3 takes the form of a four-layer element having a first or anode layer 58 of P-material which has an electrode 60 in contact with one side thereof. The second, thin base layer 62 of N-material is provided in contact with the other side of the P-material 58. The third base layer 64, also thin, and of P-material, is provided in contact with the other side of the thin layer 62, and a fourth or final layer 66 of N-material is positioned in contact with the layer 64. An electrode 68 is positioned in contact with a layer 66.

The diode 56 acts as a diode having an unvarying forward voltage drop thereacross with radiation of neutrons. The operation of the diode 56 may be understood by reference to FIG. 5.

The curve of FIG. 5, except for the portion 94 thereof, illustrates the action of a four-layer semiconductor diode such as that of FIG. 3 if, however, the two intermediate layers 62 and 64 are thicker than approximately one diffusion length. That is, as the voltage across the four-layer diode having thick central layers increases, the current through it increases slowly as shown by the portion 84 of the curve of FIG. 5. When a certain maximum voltage indicated by the point 85 is reached, the current increases along the curve 86 while the voltage drop across the diode decreases very rapidly until the point 90 is reached after which, as shown by the curve portion 92, no matter what the current through the four-layer diode may be, the voltage drop thereacross is quite constant. When the two intermediate layers 62 and 64 of FIG. 3 are thin, as shown in FIG. 3, the current versus voltage characteristic of the diode 56 of FIG. 3 takes the form 94–92, leaving out the branches 84 and 86. Therefore, a diode has been produced PN junctions in a useful current range above the point 90, produces the same voltage drop irrespective of irradiation by neutrons, whereby the circuit of FIG. 3 produces a radiation-hardened voltage standard device, the standard voltage being taken across the two diodes 14 and 56 The excess minority carriers in the layers 62 and 64 contribute to the voltage drop in the diode 56. Since, at a given current, the excess of minority carriers in the layers 62 and 64 is kept constant irregardless of the neutron radiation of the diode, the voltage drop remains constant.

Summarizing the action of the several diodes, in the diode 56 of FIG. 3, the excess of minority carriers in the layers 62 and 64 is kept constant at a value of other than zero regardless of the neutron radiation thereof. In the diodes 16 and 40 of FIGS. 1 and 2, the excess of minority carriers in the layers 36 and 46, respectively at the high recombination layer 38 and at the PN junctions 54 is kept constant at a zero value regardless of neutron irradiation.

What is claimed is:

1. A radiation-hardened diode comprising at least a layer of P-type semiconductor material in contact with a layer of N-type semiconductor material whereby a PN junction is provided, and means for causing the excess of minority carriers in said diode to be constant over a useful range of current flow through said diode upon forward biasing of said diode wherein one of said layers has a thickness of about one diffusion length in the material of said one layer upon radiation thereof, and in which a high recombination surface is provided for the side of the layer away from said PN junction.

2. The invention of claim 1 in which one of said layers includes at least one island of material of opposite conductivity type embedded therein and exposed on the side of said one layer way from said PN junction and a short circuiting electrode in contact with said side of said one layer and also in contact with said island.

3. The invention of claim 2 in which a plurality of islands is provided in said one layer, said electrode being in contact with all of said islands.

4. The invention of claim 1 in which one of said layers has a thickness of one diffusion length for minority carriers and in which a third layer of opposite conductivity type to said one layer is in contact with the side of said one layer opposite said PN junction, said third layer also having a thickness of one diffusion length and in which a fourth layer is in contact with said third layer, said fourth layer being of the same conductivity type as said one layer.

5. A radiation-insensitive, zero temperature coefficient, voltage standard device comprising a first diode, a second diode, a resistor, means for connecting said diodes and said resistor in series with a source of voltage with one of said diodes reverse biased and the other of said diodes forwardly biased, said forwardly biased diode comprising at least two layers of opposite conductivity types having one side of each of said layers in contact to thereby provide a PN junction, said forwardly biased diode including means to cause the excess of minority carriers in said diode to be constant over a useful range of current flow through said diode wherein one of said layers has a thickness of about one diffusion length in the material of said one layer upon radiation thereof, and in which a high recombination surface is provided for the side of the layer away from said PN junction.

6. The invention of claim 5 in which one of said layers includes at least one island of material of opposite conductivity type embedded therein and exposed on the side of said one layer away from said PN junction and a short circuiting electrode in contact with said side of said one layer and also in contact with said island.

7. The invention of claim 6 in which a plurality of islands is provided in said one layer, said electrode being in contact with all of said islands.

8. The invention of claim 5 in which one of said layers has a thickness of one diffusion length for minority carriers and in which a third layer of opposite conductivity type to said one layer is in contact with the side of said one layer opposite said PN junction said third layer also having a thickness of one diffusion length and in which a fourth layer is in contact with said third layer, said fourth layer being of the same conductivity type as said one layer.

* * * * *